United States Patent
Li et al.

(10) Patent No.: US 12,501,425 B2
(45) Date of Patent: Dec. 16, 2025

(54) METHOD FOR DETERMINING CELL SCHEDULING MODE, TERMINAL, AND NETWORK-SIDE DEVICE

(71) Applicant: VIVO MOBILE COMMUNICATION CO., LTD., Guangdong (CN)

(72) Inventors: Gen Li, Dongguan (CN); Xueming Pan, Dongguan (CN); Siqi Liu, Dongguan (CN); Xiaodong Yang, Dongguan (CN)

(73) Assignee: VIVO MOBILE COMMUNICATION CO., LTD., Dongguan (CN)

( * ) Notice: Subject to any disclaimer, the term of this patent is extended or adjusted under 35 U.S.C. 154(b) by 437 days.

(21) Appl. No.: 18/153,552

(22) Filed: Jan. 12, 2023

(65) Prior Publication Data
US 2023/0156697 A1    May 18, 2023

Related U.S. Application Data

(63) Continuation of application No. PCT/CN2021/107989, filed on Jul. 22, 2021.

(30) Foreign Application Priority Data

Jul. 23, 2020 (CN) .......................... 202010719844.7

(51) Int. Cl.
*H04W 72/1268* (2023.01)
*H04W 76/20* (2018.01)

(52) U.S. Cl.
CPC ....... *H04W 72/1268* (2013.01); *H04W 76/20* (2018.02)

(58) Field of Classification Search
None
See application file for complete search history.

(56) References Cited

U.S. PATENT DOCUMENTS

| 11,509,444 B2 | 11/2022 | Si et al. | |
| 2015/0189574 A1* | 7/2015 | Ng | H04W 52/245 370/254 |

(Continued)

FOREIGN PATENT DOCUMENTS

| CN | 104769990 A | 7/2015 |
| CN | 111132344 A | 5/2020 |

(Continued)

OTHER PUBLICATIONS

International Search Report and Written Opinion of the International Searching Authority regarding International Patent Application No. PCT/CN2021/107989, dated Oct. 20, 2021. Translation provided by Bohui Intellectual Property, 4 Pages.

(Continued)

*Primary Examiner* — Lonnie V Sweet
(74) *Attorney, Agent, or Firm* — Harness, Dickey & Pierce, P.L.C.

(57) ABSTRACT

A method for determining a cell scheduling mode includes: receiving scheduling configuration information, where the scheduling configuration information indicates that a second cell of the terminal is scheduled by a first cell of the terminal and that the second cell is capable of self-scheduling; determining an activity state of the first cell; and determining a scheduling mode for the second cell based on the scheduling configuration information and the activity state.

20 Claims, 6 Drawing Sheets

(56) References Cited

U.S. PATENT DOCUMENTS

| | | | |
|---|---|---|---|
| 2015/0208269 A1* | 7/2015 | Damnjanovic | H04L 5/0098 |
| | | | 370/252 |
| 2015/0280882 A1 | 10/2015 | Lee et al. | |
| 2015/0319633 A1* | 11/2015 | Ji | H04B 7/0617 |
| | | | 370/252 |
| 2016/0028532 A1 | 1/2016 | Yin et al. | |
| 2017/0048828 A1* | 2/2017 | Um | H04L 1/1896 |
| 2019/0357238 A1* | 11/2019 | Zhou | H04W 72/23 |
| 2020/0154450 A1* | 5/2020 | Zhou | H04W 72/542 |
| 2020/0323026 A1* | 10/2020 | Kim | H04W 72/0446 |
| 2021/0021397 A1* | 1/2021 | Kim | H04L 1/1896 |
| 2022/0330285 A1 | 10/2022 | Zhou | |
| 2022/0377770 A1* | 11/2022 | Li | H04L 5/0098 |
| 2023/0036466 A1* | 2/2023 | Yoshioka | H04L 5/001 |
| 2023/0209651 A1 | 6/2023 | Okamura et al. | |

FOREIGN PATENT DOCUMENTS

| | | |
|---|---|---|
| CN | 111132359 A | 5/2020 |
| EP | 3907919 A2 | 11/2021 |
| WO | WO-2019214637 A1 | 11/2019 |
| WO | WO-2022009288 A1 | 1/2022 |

OTHER PUBLICATIONS

First Office Action regarding Japanese Patent Application No. 2023-502760, dated Jan. 4, 2024, 5 pages.

Extended European Search Report for European Patent Application No. 21845442.9, dated Nov. 20, 2023, 12 pages.

Vivo, "Fast Scell Activation and Dormancy Like Behavior", Document R1-1910242, 3GPP TSG RAN WG1 #98bis, Oct. 14-20, 2019, 11 pages.

Huawei et al., "Discussion on SCell Activation and Deactivation", Document R1-1908099, 3GPP TSG RAN WG1 Meeting #98, Aug. 26-30, 2019, 17 pages.

\* cited by examiner

METHOD FOR DETERMINING CELL SCHEDULING MODE, TERMINAL, AND NETWORK-SIDE DEVICE

CROSS-REFERENCE TO RELATED APPLICATIONS

The application is a Bypass Continuation Application of PCT/CN2021/107989, filed on Jul. 22, 2021, which claims priority to Chinese Patent Application No. 202010719844.7, filed on Jul. 23, 2020, which are incorporated herein by reference in their entirety.

TECHNICAL FIELD

This disclosure pertains to the field of wireless communication technologies, and specifically relates to a method and an apparatus for determining a cell scheduling mode, a terminal, and a network-side device.

BACKGROUND 5G new radio (NR) systems support carrier aggregation (CA), allowing configuration and activation of multiple carriers (CC) or cells for user equipment (UE) and cross-carrier scheduling under CA. In addition, NR also supports multiple transmission and reception panel (M-TRP) scenarios, and UE may be scheduled to perform data transmission and reception with multiple TRPs.

SUMMARY

Embodiments of this disclosure provide a method and an apparatus for determining a cell scheduling mode, a terminal, and a network-side device.

According to a first aspect, a method for determining a cell scheduling mode is provided, performed by a terminal. The method includes: receiving scheduling configuration information, where the scheduling configuration information indicates that a second cell of the terminal is scheduled by a first cell of the terminal and that the second cell is capable of self-scheduling; determining an activity state of the first cell; and determining a scheduling mode for the second cell based on the scheduling configuration information and the activity state.

According to a second aspect, an apparatus for determining a cell scheduling mode is provided, including a receiving module, configured to receive scheduling configuration information, where the scheduling configuration information indicates that a second cell of a terminal is scheduled by a first cell of the terminal and that the second cell is capable of self-scheduling; a first determining module, configured to determine an activity state of the first cell; and a second determining module, configured to determine a scheduling mode for the second cell based on the scheduling configuration information and the activity state.

According to a third aspect, a method for determining a cell scheduling mode is provided, performed by a network-side device. The method includes: transmitting scheduling configuration information, where the scheduling configuration information indicates that a second cell of a terminal is scheduled by a first cell of the terminal and that the second cell is capable of self-scheduling; determining an activity state of the first cell; and determining a scheduling mode for the second cell based on the scheduling configuration information and the activity state.

Optionally, the scheduling configuration information further indicates at least one of the following: a common search space configured on the second cell; a first UE-specific search space group configured on the second cell, where the first UE-specific search space group includes one or more complete UE-specific search spaces; a second UE-specific search space group configured on the second cell, where the second UE-specific search space group includes one or more incomplete UE-specific search spaces, or the second UE-specific search space group includes one or more UE-specific search spaces that are capable of being mapped for cross-carrier scheduling; and a search space configured on the first cell.

Optionally, in a case that one complete UE-specific search space is a search space capable of being mapped for cross-carrier scheduling, the complete UE-specific search space belongs to both the first UE-specific search space group and the second UE-specific search space group.

Optionally, the activity state of the first cell includes any one of the following: an active state; an inactive state; transitioning from the active state to the inactive state; transitioning from the inactive state to the active state; a dormancy state; a non-dormancy state; transitioning from the dormancy state to the non-dormancy state; transitioning from the non-dormancy state to the dormancy state; having a search space capable of scheduling the second cell on an active BWP; having no search space capable of scheduling the second cell on an active BWP; switching from a first BWP to a second BWP, where the first BWP has a search space capable of scheduling the second cell, and the second BWP has no search space capable of scheduling the second cell; and switching from the second BWP to the first BWP.

Optionally, the determining a scheduling mode for the second cell based on the scheduling configuration information and the activity state includes: in a case that the first cell is in a first target state, determining that the second cell is cross-carrier scheduled by the search space on the first cell, and that scheduling with scrambling by a specific radio network temporary identifier RNTI is not performed in the CSS configured on the second cell and/or the first UE-specific search space group; or determining that the second cell is cross-carrier scheduled by the search space on the first cell, that scheduling with scrambling by a specific RNTI is performed in the CSS configured on the second cell, and that scheduling with scrambling by a specific RNTI is not performed in the first UE-specific search space group; where the first target state includes at least one of the following: active state; non-dormancy state; or having a search space capable of scheduling the second cell on the active BWP.

Optionally, the determining a scheduling mode for the second cell based on the scheduling configuration information and the activity state includes: in a case that the first cell is in a second target state, determining that the first cell is incapable of scheduling the second cell, and that scheduling with scrambling by a specific RNTI is performed in the CSS configured on the second cell and/or some or all USSs in the first UE-specific search space group; or determining that the first cell is incapable of scheduling the second cell, that CSS self-scheduling with scrambling by a specific RNTI is performed on the second cell, and that scheduling with scrambling by a specific RNTI is performed in the CSS configured on the second cell and some or all USSs in the first UE-specific search space group; where the second target state includes at least one of the following: the inactive state; the dormancy state; or having no search space capable of scheduling the second cell on the active BWP.

Optionally, the some USSs are search spaces in the first UE-specific search space group, and the some USSs have a same identifier as a target search space, where the target search space is a search space in a currently active BWP of the first cell.

Optionally, the determining a scheduling mode for the second cell based on the scheduling configuration information and the activity state includes: in a case that the first cell is in a third target state, at a first target moment after first target information is transmitted, enabling a function of performing scheduling with scrambling by a specific RNTI in the CSS configured on the second cell and/or the first UE-specific search space group; where the third target state includes at least one of the following: transitioning from the active state to the inactive state; transitioning from the non-dormancy state to the dormancy state; or switching from the first BWP to the second BWP.

Optionally, the first target information includes any one of the following: deactivation signaling for the first cell, control information indicating transitioning from non-dormancy state to dormancy state, and control information indicating switching from the first BWP to the second BWP.

Optionally, the first target moment includes any one of the following: an effective moment of an event indicated by the first target information; when a predetermined time has elapsed since an effective moment of an event indicated by the first target information; and a moment configured by radio resource control RRC signaling.

Optionally, the determining a scheduling mode for the second cell based on the scheduling configuration information and the activity state includes: in a case that the first cell is in a third target state, at a second target moment after a target timer expires, enabling a function of performing scheduling with scrambling by a specific RNTI in the CSS configured on the second cell and/or the first UE-specific search space group; where the third target state includes at least one of the following: transitioning from the active state to the inactive state; transitioning from the non-dormancy state to the dormancy state; or switching from the first BWP to the second BWP.

Optionally, the target timer includes a cell deactivation timer or a BWP inactivity timer.

Optionally, the second target moment includes: an effective moment of an event indicated by expiration of the target timer; when a predetermined time has elapsed since an effective moment of an event indicated by expiration of the target timer; or a moment configured by RRC signaling.

Optionally, the determining a scheduling mode for the second cell based on the scheduling configuration information and the activity state includes: in a case that the first cell is in a fourth target state, at a third target moment after second target information is transmitted, disabling a function of performing scheduling with scrambling by a specific RNTI in the CSS configured on the second cell and/or the first UE-specific search space group; where the fourth target state includes at least one of the following: transitioning from the inactive state to the active state; transitioning from the dormancy state to the non-dormancy state; or switching from the second BWP to the first BWP.

Optionally, the third target moment includes any one of the following: an effective moment of an event indicated by the second target information; when a predetermined time has elapsed since an effective moment of an event indicated by the second target information; and a moment configured by RRC signaling.

Optionally, the second target information includes any one of the following: activation signaling for activating the first cell; control information indicating that the first cell transitions from dormancy state to non-dormancy state; and control information indicating that the first cell switches from the second BWP to the first BWP.

Optionally, the method further includes: in a case that the scheduling configuration information indicates that the second cell is scheduled by the first cell, determining a behavior undesired by the terminal through pre-negotiation, where the behavior undesired by the terminal includes at least one of the following: transmitting control signaling for deactivating the first cell; configuring a cell deactivation timer for the first cell; or configuring a BWP inactivity timer for a BWP of the first cell capable of scheduling the second cell; and switching from a BWP of the first cell capable of scheduling the second cell to a BWP of the first cell incapable of scheduling the second cell.

Optionally, the method further includes: in a case that the scheduling configuration information indicates that the second cell is scheduled by the first cell, ignoring at least one of the following: control signaling for deactivating the first cell; configuring a cell deactivation timer for the first cell; configuring a BWP inactivity timer for a BWP of the first cell capable of scheduling the second cell; or control information indicating switching from a BWP of the first cell capable of scheduling the second cell to a BWP of the first cell incapable of scheduling the second cell.

Optionally, the first cell is a secondary cell, and the second cell is a primary cell.

According to a fourth aspect, an apparatus for determining a cell scheduling mode is provided, including a transmitting module, configured to transmit scheduling configuration information, where the scheduling configuration information indicates that a second cell of a terminal is scheduled by a first cell of the terminal and that the second cell is capable of self-scheduling; a third determining module, configured to determine an activity state of the first cell; and a fourth determining module, configured to determine a scheduling mode for the second cell based on the scheduling configuration information and the activity state.

Optionally, the scheduling configuration information further indicates at least one of the following: a common search space CSS configured on the second cell; a first UE-specific search space group configured on the second cell, where the first UE-specific search space group includes one or more complete UE-specific search spaces USS; a second UE-specific search space group configured on the second cell, where the second UE-specific search space group includes one or more incomplete UE-specific search spaces, or the second UE-specific search space group includes one or more UE-specific search spaces that are capable of being mapped for cross-carrier scheduling; and a search space configured on the first cell.

Optionally, in a case that one complete UE-specific search space is a search space capable of being mapped for cross-carrier scheduling, the complete UE-specific search space belongs to both the first UE-specific search space group and the second UE-specific search space group.

Optionally, the activity state of the first cell includes any one of the following:

the active state;
the inactive state;
transitioning from the active state to the inactive state;
transitioning from the inactive state to the active state;
the dormancy state;
the non-dormancy state;
transitioning from the dormancy state to the non-dormancy state;

transitioning from the non-dormancy state to the dormancy state;
having a search space capable of scheduling the second cell on an active BWP;
having no search space capable of scheduling the second cell on an active BWP;
switching from a first BWP to a second BWP, where the first BWP has a search space capable of scheduling the second cell, and the second BWP has no search space capable of scheduling the second cell; and
switching from the second BWP to the first BWP.

Optionally, that a fourth determining module is configured to determine a scheduling mode for the second cell based on the scheduling configuration information and the activity state includes: in a case that the first cell is in a first target state, determining that the second cell is cross-carrier scheduled by the search space on the first cell, and that scheduling with scrambling by a specific RNTI is not performed in the CSS configured on the second cell and/or the first UE-specific search space group; or determining that the second cell is cross-carrier scheduled by the search space on the first cell, that scheduling with scrambling by a specific RNTI is performed in the CSS configured on the second cell, and that scheduling with scrambling by a specific RNTI is not performed in the first UE-specific search space group; where the first target state includes at least one of the following: active state; non-dormancy state; or having a search space capable of scheduling the second cell on the active BWP.

Optionally, that a fourth determining module is configured to determine a scheduling mode for the second cell based on the scheduling configuration information and the activity state includes: in a case that the first cell is in a second target state, determining that the first cell is incapable of scheduling the second cell, and that scheduling with scrambling by a specific RNTI is performed in the CSS configured on the second cell and/or some or all USSs in the first UE-specific search space group; or determining that the first cell is incapable of scheduling the second cell, that CSS self-scheduling with scrambling by a specific RNTI is performed on the second cell, and that scheduling with scrambling by a specific RNTI is performed in the CSS configured on the second cell and some or all USSs in the first UE-specific search space group; where the second target state includes at least one of the following: the inactive state; the dormancy state; or having no search space capable of scheduling the second cell on the active BWP.

Optionally, the some USSs are search spaces in the first UE-specific search space group, and the some USSs have a same identifier as a target search space, where the target search space is a search space in a currently active BWP of the first cell.

Optionally, the determining a scheduling mode for the second cell based on the scheduling configuration information and the activity state includes: in a case that the first cell is in a third target state, at a first target moment after first target information is transmitted, enabling a function of performing scheduling with scrambling by a specific RNTI in the CSS configured on the second cell and/or the first UE-specific search space group; where the third target state includes at least one of the following: transitioning from the active state to the inactive state; transitioning from the non-dormancy state to the dormancy state; or switching from the first BWP to the second BWP.

Optionally, the first target information includes any one of the following: deactivation signaling for the first cell, control information indicating transitioning from non-dormancy state to dormancy state, and control information indicating switching from the first BWP to the second BWP.

Optionally, the first target moment includes any one of the following: an effective moment of an event indicated by the first target information; when a predetermined time has elapsed since an effective moment of an event indicated by the first target information; and a moment configured by RRC signaling.

Optionally, that a fourth determining module is configured to determine a scheduling mode for the second cell based on the scheduling configuration information and the activity state includes: in a case that the first cell is in a third target state, at a second target moment after a target timer expires, enabling a function of performing scheduling with scrambling by a specific RNTI in the CSS configured on the second cell and/or the first UE-specific search space group; where the third target state includes at least one of the following: transitioning from the active state to the inactive state; transitioning from the non-dormancy state to the dormancy state; or switching from the first BWP to the second BWP.

Optionally, the target timer includes a cell deactivation timer or a BWP inactivity timer.

Optionally, the second target moment includes any one of the following: an effective moment of an event indicated by expiration of the target timer; when a predetermined time has elapsed since an effective moment of an event indicated by expiration of the target timer; and a moment configured by RRC signaling.

Optionally, that a fourth determining module is configured to determine a scheduling mode for the second cell based on the scheduling configuration information and the activity state includes: in a case that the first cell is in a fourth target state, at a third target moment after second target information is transmitted, disabling a function of performing scheduling with scrambling by a specific RNTI in the CSS configured on the second cell and/or the first UE-specific search space group; where the fourth target state includes at least one of the following: transitioning from the inactive state to the active state; transitioning from the dormancy state to the non-dormancy state; or switching from the second BWP to the first BWP.

Optionally, the third target moment includes any one of the following: an effective moment of an event indicated by the second target information; when a predetermined time has elapsed since an effective moment of an event indicated by the second target information; and a moment configured by RRC signaling.

Optionally, the second target information includes any one of the following: activation signaling for activating the first cell; control information indicating that the first cell transitions from dormancy state to non-dormancy state; and control information indicating that the first cell switches from the second BWP to the first BWP.

Optionally, the third determining module is further configured to: in a case that the scheduling configuration information indicates that the second cell is scheduled by the first cell, determine a behavior undesired by the terminal through pre-negotiation, where the behavior undesired by the terminal includes at least one of the following: transmitting control signaling for deactivating the first cell; configuring a cell deactivation timer for the first cell; configuring a BWP inactivity timer for a BWP of the first cell capable of scheduling the second cell; or switching from a BWP of the first cell capable of scheduling the second cell to a BWP of the first cell incapable of scheduling the second cell.

Optionally, the third determining module is further configured to: in a case that the scheduling configuration information indicates that the second cell is scheduled by the first cell, ignore at least one of the following: control signaling for deactivating the first cell; configuring a cell deactivation timer for the first cell; or configuring a BWP inactivity timer for a BWP of the first cell capable of scheduling the second cell; and control information indicating switching from a BWP of the first cell capable of scheduling the second cell to a BWP of the first cell incapable of scheduling the second cell.

Optionally, the first cell is a secondary cell, and the second cell is a primary cell.

According to a fifth aspect, a terminal is provided. The terminal includes a processor, a memory, and a program or instructions stored in the memory and executable on the processor, and when the program or instructions are executed by the processor, the steps of the method according to the first aspect are implemented.

According to a sixth aspect, a network-side device is provided. The network-side device includes a processor, a memory, and a program or instructions stored in the memory and executable on the processor, and when the program or instructions are executed by the processor, the steps of the method according to the third aspect are implemented.

According to a seventh aspect, a non-transitory computer readable storage medium is provided. The non-transitory computer readable storage medium stores a program or instructions, and when the program or instructions are executed by a processor, the steps of the method according to the first aspect or the third aspect are implemented.

According to an eighth aspect, a chip is provided. The chip includes a processor and a communication interface, the communication interface is coupled to the processor, and the processor is configured to run a communication device program or communication device instructions to implement the method according to the first aspect or the third aspect.

DESCRIPTION OF EMBODIMENTS

The following clearly describes the technical solutions in the embodiments of this disclosure with reference to the accompanying drawings in the embodiments of this disclosure. Apparently, the described embodiments are some but not all of the embodiments of this disclosure. All other embodiments obtained by a person of ordinary skill in the art based on the embodiments of this disclosure shall fall within the protection scope of this disclosure.

The terms "first", "second", and the like in this specification and claims of this disclosure are used to distinguish between similar objects instead of describing a specific order or sequence. It should be understood that data used in this way is used interchangeably in appropriate circumstances so that the embodiments of this disclosure can be implemented in other orders than the order illustrated or described herein. In addition, objects differentiated by "first" and "second" are usually of a same type. The number of objects is not limited. For example, a first object may indicate one or more objects. In addition, in this specification and claims, "and/or" represents at least one of connected objects, and the symbol "/" generally represents an "or" relationship between the associated objects.

It should be noted that the technologies described in the embodiments of this disclosure are not limited to long term evolution (LTE)/LTE-Advanced (LTE-A) systems, and may also be used in other wireless communication systems, such as code division multiple access (CDMA), time division multiple access (TDMA), frequency division multiple access (FDMA), orthogonal frequency division multiple access (OFDMA), single-carrier frequency-division multiple access (SC-FDMA), and other systems. The terms "system" and "network" in the embodiments of this disclosure are often used interchangeably. The technology described herein may be used in the foregoing systems and radio technologies as well as other systems and radio technologies. However, in the following descriptions, a new radio (NR) system is described for an illustration purpose, and NR terms are used in most of the following descriptions, although these technologies may also be performed by other disclosures than an NR system disclosure, for example, 6-th generation (6G) communication systems.

Figure 1:
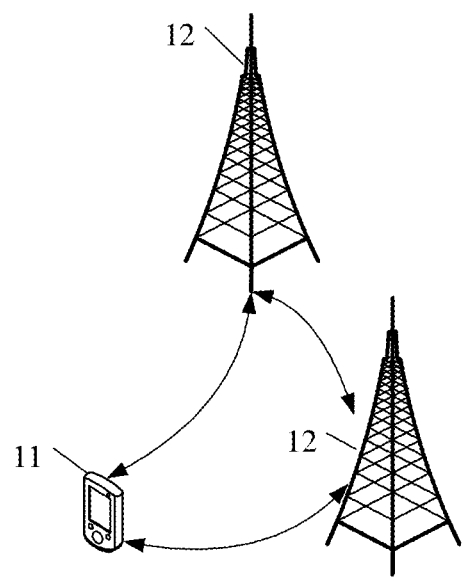
FIG. 1 is a block diagram of a wireless communication system to which an embodiment of this disclosure may be applied.

FIG. 1 is a block diagram of a wireless communication system to which an embodiment of this disclosure may be applied. The wireless communication system includes a terminal 11 and a network-side device 12. The terminal 11 may also be referred to as a terminal device or user equipment (UE). The terminal 11 may be a terminal-side device such as a mobile phone, a tablet personal computer, a laptop computer or a notebook computer, a personal digital assistant (PDA), a palmtop computer, a netbook, an ultra-mobile personal computer (UMPC), a mobile internet device (MID), a wearable device or an in-vehicle device (VUE), or a pedestrian user equipment (PUE). The wearable device includes a wristband, earphones, glasses, or the like. It should be noted that the terminal 11 is not limited to a specific type in the embodiments of this disclosure. The network-side device 12 may be a base station or a core network. The base station may be referred to as a NodeB, an evolved NodeB, an access point, a base transceiver station (BTS), a radio base station, a radio transceiver, a basic service set (BSS), an extended service set (ESS), a Node B, an evolved node B (eNB), a home NodeB, a home evolved NodeB, a WLAN access point, a Wi-Fi node, a transmission-reception point (Transmitting Receiving Point, TRP), or some other appropriate term in the art. As long as the same technical effect is achieved, the base station is not limited to a specific technical term. It should be noted that the base station in the NR system is used only as an example in the embodiments of this disclosure, and a specific type of the base station is not limited.

In current NR systems, both primary cells (Pcells) and secondary cells (Scells) can be configured to be self-scheduled, but only Scells can be cross-carrier scheduled by a Pcell or another Scell, and Pcells can only be self-scheduled. When an Scell is configured to be cross-carrier scheduled, it is necessary to configure an identifier of a serving cell (serving cell ID) scheduling the cell, and a carrier indicator field (CIF) value for scheduling by the serving cell.

It can be learned that in existing NR, one cell can be scheduled by only one scheduling cell (meaning that one cell can only be scheduled by the cell itself or another cell). Currently, Pcells can only be self-scheduled. In consideration of enhancing control channel coverage, Pcells are generally deployed on low band carriers. However, low band carriers have insufficient bandwidth and have been mostly used for deployment of other technologies (for example, LTE).

Therefore, a solution to the problem of limited capacity of Pcell control channels may be configuring high band carriers for Scells and using Scell to schedule Pcell, so as to reduce control channel PDCCH overheads. However, no specific scheme has been provided yet as to how a cell scheduling mode is determined for scheduling Pcell by Scell.

The following details the methods for determining a cell scheduling mode provided in the embodiments of this disclosure through some embodiments and disclosure scenarios thereof with reference to the accompanying drawings.

Figure 2:
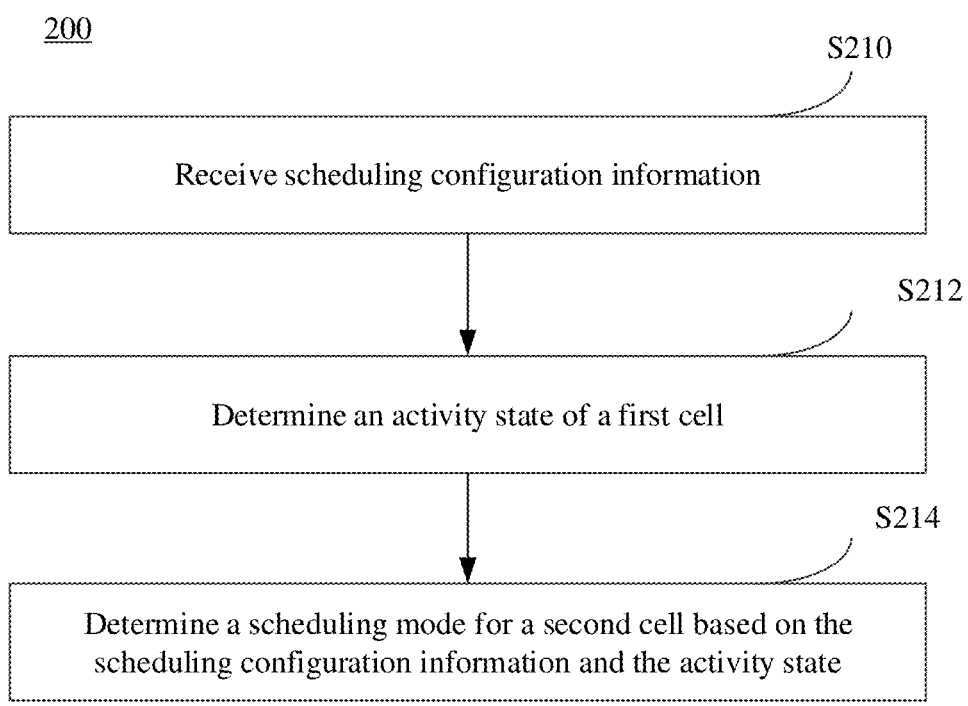
FIG. 2 is a schematic flowchart of a method for determining a cell scheduling mode according to an embodiment of this disclosure.

FIG. 2 is a schematic flowchart of a method for determining a cell scheduling mode according to an embodiment of this disclosure. The method 200 may be performed by a terminal. In other words, the method may be performed by software or hardware installed on the terminal. As shown in FIG. 2, the method may include the following steps.

S210. Receive scheduling configuration information, where the scheduling configuration information indicates that a second cell of the terminal is scheduled by a first cell of the terminal and that the second cell is capable of self-scheduling.

In this embodiment of this disclosure, the first cell may be an Scell, and the second cell may be a Pcell. Certainly, the cells are not limited to thereto. If an Scell is capable of being self-scheduled and scheduled by other cells, the second cell may alternatively be an Scell, and the first cell may alternatively be a Pcell or an S cell. This may be specifically determined based on a communication system used, and is not limited in the embodiments of this disclosure.

In some embodiments, the scheduling configuration information may include indication information indicating that the second cell is scheduled by the first cell and that the second cell is capable of self-scheduling.

In a possible implementation, the scheduling configuration information further indicates at least one of the following (1) to (4).

(1) A common search space (CSS) configured on the second cell, namely, a CSS configured by the second cell in this possible implementation. In some embodiments, the scheduling configuration information may include information related to the CSS configured by the second cell, for example, an identifier.

(2) A first UE-specific search space group configured on the second cell, where the first UE-specific search space group includes one or more complete UE-specific search spaces (USS), namely, a first USS group configured by the second cell in this possible implementation, where the first USS group includes one or more complete USSs. In some embodiments, the scheduling configuration information may include information related to the first USS group configured by the second cell, for example, an identifier.

Optionally, in a case that one complete UE-specific search space is a search space capable of being mapped for cross-carrier scheduling, the complete UE-specific search space belongs to both the first UE-specific search space group and the second UE-specific search space group. In other words, for a complete USS that is also a search space capable of being mapped for cross-carrier scheduling, an aggregation level thereof is shared by self-carrier scheduling and cross-carrier scheduling; or two aggregation levels are configured, and in this case, the USS belongs to both the first USS group and a second USS group.

(3) A second UE-specific search space group configured on the second cell, where the second UE-specific search space group includes one or more incomplete UE-specific search spaces, or the second UE-specific search space group includes one or more UE-specific search spaces capable of being mapped for cross-carrier scheduling, namely, a second USS group configured by the second cell in this possible implementation, where the second USS group includes one or more incomplete USSs. In some embodiments, the scheduling configuration information may include information related to the second USS group configured by the second cell, for example, an identifier.

(4) A search space configured on the first cell, for example, information related to the search space configured by the first cell, for example, an identifier.

In this embodiment of this disclosure, the incomplete USS configuration is a USS configuration that includes only specific fields such as aggregation level and SS ID, and the complete USS configuration can correspond to a specific time-frequency domain USS. If the USS in this disclosure corresponds to an incomplete USS configuration, it must be capable of being mapped for cross-carrier scheduling.

S212. Determine an activity state of the first cell.

In a possible implementation, the activity state of the first cell includes but is not limited to any one of the following:
 (1) the active state;
 (2) the inactive state;
 (3) transitioning from the active state to the inactive state;
 (4) transitioning from the inactive state to the active state;
 (5) the dormancy state;
 (6) the non-dormancy state;
 (7) transitioning from the dormancy state to the non-dormancy state;
 (8) transitioning from the non-dormancy state to the dormancy state;
 (9) having a search space capable of scheduling the second cell on an active BWP;
 (10) having no search space capable of scheduling the second cell on an active BWP;
 (11) switching from a first BWP to a second BWP, where the first BWP has a search space capable of scheduling the second cell, and the second BWP has no search space capable of scheduling the second cell; and
 (12) switching from the second BWP to the first BWP.

It should be noted that although S210 taking place before S212 is used as an example for description in this disclosure, this is not limited thereto. In practical disclosures, there is no strict time order between S210 and S212.

S214. Determine a scheduling mode for the second cell based on the scheduling configuration information and the activity state.

In a possible implementation, the determining a scheduling mode for the second cell based on the scheduling configuration information and the activity state includes:

in a case that the first cell is in a first target state, determining that the second cell is cross-carrier scheduled by the search space on the first cell, and that scheduling with scrambling by a specific radio network temporary identifier (RNTI) is not performed in the CSS configured on the second cell and/or the first UE-specific search space group; or determining that the second cell is cross-carrier scheduled by the search space on the first cell, that scheduling with scrambling by a specific RNTI is performed in the CSS configured on the second cell, and that scheduling with scrambling by a specific RNTI is not performed in the first UE-specific search space group; where the first target state includes at least one of the following: active state; non-dormancy state; or having a search space capable of scheduling the second cell on the active BWP.

In the foregoing possible implementation, a specific RNTI includes but is not limited to at least one of the following: cell RNTI (C-RNTI), configured scheduling RNTI (CS-RNTI), or MCS-C-RNTI.

In the foregoing possible implementation, the search space for cross-carrier scheduling the second cell on the first cell may be a search space that satisfies a specific condition, for example, a search space with a same identifier as a search space in an active BWP of the first cell.

For example, based on an assumption that a Pcell is configured to be scheduled by an Scell 1 and that the Pcell is configured with a CSS, if the first cell is in the first target state, it is determined that the Pcell is cross-carrier scheduled by an SS meeting a condition on the Scell 1, but not self-scheduled with scrambling by a specific RNTI (for example, C-RNTI, CS-RNTI, or MCS-C-RNTI) (if the communication device is a terminal, the terminal may not monitor RNTI scrambled self-scheduling on the second cell). In other words, scheduling with a specific RNTI is not performed in the configured CSS and/or USS group 1 (if configured). Alternatively, it is determined that the Pcell is cross-carrier scheduled by an SS meeting a condition on the Scell 1 and that CSS self-scheduling with scrambling by a specific RNTI is also implemented. In other words, scheduling with a specific RNTI is not performed in the configured USS group 1 (if configured), and the terminal may not monitor RNTI scrambled CSS self-scheduling on the second cell.

In another possible implementation, the determining a scheduling mode for the second cell based on the scheduling configuration information and the activity state may include:

in a case that the first cell is in a second target state, determining that the first cell is incapable of scheduling the second cell, and that scheduling with scrambling by a specific RNTI is performed in the CSS configured on the second cell and/or some or all USSs in the first UE-specific search space group; or determining that the first cell is incapable of scheduling the second cell, that CSS self-scheduling with scrambling by a specific RNTI is performed on the second cell, and that scheduling with scrambling by a specific RNTI is performed in the CSS configured on the second cell and some or all USSs in the first UE-specific search space group; where the second target state includes at least one of the following: the inactive state; the dormancy state; or having no search space capable of scheduling the second cell on the active BWP.

According to the foregoing possible implementation, the scheduling mode for the second cell can be determined when the first cell is in the inactive state, the dormancy state, or the state of having no search space capable of scheduling the second cell on the active BWP.

For example, based on an assumption that a Pcell is configured to be scheduled by an Scell 1 and that the Pcell is configured with a CSS, if the first cell is in the second target state, it is determined that:

the Scell 1 cannot schedule the Pcell, self-scheduling with scrambling by a specific RNTI (for example, C-RNTI, CS-RNTI, or MCS-C-RNTI) is implemented, in other words, scheduling with a specific RNTI is performed in the configured CSS and/or part or all of a USS group 1 (if configured), and the terminal may monitor RNTI-scrambled self-scheduling on the second cell; or the Scell 1 cannot schedule the Pcell, CSS self-scheduling with scrambling by a specific RNTI is implemented, and self-scheduling with scrambling by a specific RNTI is implemented in a USS group 1 (if configured), that is, scheduling with a specific RNTI is performed in part or all of a USS group 1 (if configured), and the terminal may not monitor RNTI-scrambled CSS self-scheduling on the second cell.

In the foregoing possible implementation, the some USSs are search spaces in the first UE-specific search space group, and the some USSs have a same identifier as the target search space, where the target search space is a search space in a currently active BWP of the first cell. That is, the some USSs are search spaces in the first USS group that have a same identifier as a search space in a currently active BWP.

For example, it is assumed that the Pcell of the terminal is configured to be scheduled by the Scell 1, and CSS #1, fully configured USS #2 and USS # 3, and non-fully configured USS #4 and USS #5 (configured with only an SS ID and an aggregation level) are configured on BWP #1. In addition, the Pcell can be scheduled only by a USS of the Scell corresponding to a non-fully configured USS ID.

USS #4 is configured on BWP #2 of the Scell 1, and USS #2 is configured on BWP #2. At this time, BWP #2 of the Scell 1 is the active BWP. Therefore, in this case, self-scheduling is not performed in USS #2 and USS #3 of the Pcell.

At an effective moment corresponding to a MAC CE for inactivity received by the UE in the Scell 1, or when sCellDeactivationTimer expires, or at an effective moment corresponding to received DCI indicating that the Scell 1 enters the dormancy state, self-scheduling function is enabled in USS #2 and USS #3.

Alternatively, when the UE receives DCI in the Scell 1, where the DCI indicates switching from BWP #2 to BWP #3, or at an effective moment of BWP switching for switching to BWP #3 after an inactivity timer of BWP #2 expires, self-scheduling function is enabled in USS #2 and USS #3.

Optionally, CSS #1 may have self-scheduling always on, or may enable or disable self-scheduling like USS #2 and USS #3.

In still another possible implementation, the determining a scheduling mode for the second cell based on the scheduling configuration information and the activity state may include:

in a case that the first cell is in a third target state, at a first target moment after first target information is received, enabling a function of performing scheduling with scrambling by a specific RNTI in the CSS configured on the second cell and/or the first UE-specific search space group; where the third target state includes at least one of the following: transitioning from the active state to the inactive state; transitioning from the non-dormancy state to the dormancy state; or switching from the first BWP to the second BWP.

In the foregoing possible implementation, the first target information includes but is not limited to any one of the following: deactivation signaling for the first cell, control information indicating transitioning from non-dormancy state to dormancy state, and control information indicating switching from the first BWP to the second BWP.

For example, based on an assumption that a Pcell is configured to be scheduled by an Scell 1 and that the Pcell is configured with a CSS, if the first cell is in the second target state, the terminal may determine to enable a function of scheduling with a specific RNTI in the configured CSS and/or a USS group 1 (if configured) at a first target moment after deactivation signaling for the Scell 1, or DCI indicating switching from non-dormancy to dormancy, or DCI indicating BWP switching is received.

In a possible implementation, the first target moment includes any one of the following: an effective moment of an event indicated by the first target information; when a predetermined time has elapsed since an effective moment of an event indicated by the first target information; and a moment configured by radio resource control (Radio Resource Control, RRC) signaling. The predetermined time may be configured by a network side or predefined, which is not specifically limited in this embodiment.

For example, the first target moment is a moment when the Scell is inactive, a moment when the Scell enters the dormancy state, or a moment when BWP switching takes effect; or the first target moment is a specific time after the Scell is inactive, a specific time after the Scell enters the dormancy state, or a specific time after an effective moment of BWP switching.

Alternatively, in a possible implementation, the determining a scheduling mode for the second cell based on the scheduling configuration information and the activity state may include:

in a case that the first cell is in a third target state, at a second target moment after a target timer expires, enabling a function of performing scheduling with scrambling by a specific RNTI in the CSS configured on the second cell and/or the first UE-specific search space group; where
the third target state includes at least one of the following: transitioning from the active state to the inactive state; transitioning from the non-dormancy state to the dormancy state; or switching from the first BWP to the second BWP.

In the foregoing possible implementation, optionally, the target timer includes a cell deactivation timer or a BWP inactivity timer.

In the foregoing possible implementation, optionally, the second target moment includes any one of the following:
an effective moment of an event indicated by expiration of the target timer;
when a predetermined time has elapsed since an effective moment of an event indicated by expiration of the target timer; and
a moment configured by RRC signaling.

For example, assuming that a Pcell is configured to be scheduled by an Scell 1 and that the Pcell is configured with a CSS, expiration of a cell deactivation timer (sCellDeactivationTimer) of the Scell 1 triggers the Scell 1 to change from the active state to the inactive state, or expiration of a BWP inactivity timer (bwpInactivityTimer) of a current BWP (second BWP) of the Scell 1 triggers BWP switching of the Scell 1. A function of scheduling with a specific RNTI is enabled for the configured CSS and/or a USS group 1 (if configured) at a specific moment after the Scell 1 switches from the active state to the inactive state or the Scell 1 performs BWP switching.

The specific moment is an effective moment of Scell deactivation or an effective moment of BWP switching after a timer expires; or the specific moment is a moment that is a specific time after an effective moment of Scell deactivation or an effective moment of BWP switching after a timer expires; or the specific moment is a moment configured by RRC signaling.

In a possible implementation, the determining a scheduling mode for the second cell based on the scheduling configuration information and the activity state may include:

in a case that the first cell is in a fourth target state, at a third target moment after second target information is received, disabling a function of performing scheduling with scrambling by a specific RNTI in the CSS configured on the second cell and/or the first UE-specific search space group; where if the communication device is a network-side device, the second target information being received may be transmitting the second target information, or if the communication device is a terminal, the second target information being received may be receiving the second target information.

the fourth target state includes at least one of the following: transitioning from the inactive state to the active state; transitioning from the dormancy state to the non-dormancy state; or switching from the second BWP to the first BWP.

In the foregoing possible implementation, the third target moment includes any one of the following:
an effective moment of an event indicated by the second target information;
when a predetermined time has elapsed since an effective moment of an event indicated by the second target information; and
a moment configured by RRC signaling.

In foregoing possible implementation, the second target information includes any one of the following:
activation signaling for activating the first cell;
control information indicating that the first cell transitions from dormancy state to non-dormancy state; and
control information indicating that the first cell switches from the second BWP to the first BWP.

For example, it is assumed that a Pcell is configured to be scheduled by an Scell 1 and that the Pcell is configured with a CSS. When the Scell 1 is switching from the inactive state to the active state, switching from dormancy to non-dormancy, and/or in BWP switching (changing from a BWP capable of scheduling the Pcell to a state of having no BWP capable of scheduling the Pcell), the UE disables a function of scheduling with a specific RNTI in the configured CSS and/or a USS group 1 (if configured) at a specific movement after an activation MAC CE for the Scell 1, or DCI indicating switching from dormancy to non-dormancy, or DCI indicating BWP switching (that is, the third target moment) is received.

The specific moment is an effective moment of Scell 1 activation, the Scell 1 entering the non-dormancy state, or BWP switching.

Alternatively, the specific moment is a moment that is a specific time after an effective moment of Scell activation, a moment that is a specific time after an effective moment of the Scell entering the non-dormancy state, or a moment that is a specific time after an effective moment of BWP switching.

Alternatively, the specific moment is a moment configured by RRC signaling.

In the foregoing possible implementation, the method may further include: in a case that the scheduling configuration information indicates that the second cell is scheduled by the first cell, determining a behavior undesired by the terminal through pre-negotiation, where the behavior undesired by the terminal includes at least one of the following:

receiving control signaling for deactivating the first cell, that is, the UE being undesired to receive control signaling for deactivating the first cell, for example, a MAC CE;

configuring a cell deactivation timer for the first cell, that is, the UE being undesired to receive a cell deactivation timer configured for the first cell, for example, sCell-DeactivationTimer;

configuring a BWP inactivity timer for a BWP of the first cell capable of scheduling the second cell, for example, the UE being undesired to configure bwpInactivityTimer for a BWP that is of the Scell 1 for scheduling the Pcell and that is capable of scheduling the Pcell, that is, being undesired to deactivate a BWP capable of scheduling the Pcell; or switching from a BWP of the first cell capable of scheduling the second cell to a BWP of the first cell incapable of scheduling the second cell, for example, the UE being undesired to switch the Scell 1 for scheduling the Pcell from a BWP capable of scheduling the Pcell to a BWP incapable of scheduling the Pcell.

With the foregoing possible implementations, the UE does not expect the first cell to switch to a state in which the second cell cannot be scheduled, so as to ensure normal scheduling of the second cell by the first cell.

In a possible implementation, the method further includes: in a case that the scheduling configuration information indicates that the second cell is scheduled by the first cell, ignoring at least one of the following:

control signaling for deactivating the first cell;
configuring a cell deactivation timer for the first cell;
configuring a BWP inactivity timer for a BWP of the first cell capable of scheduling the second cell; or
control information indicating switching from a BWP of the first cell capable of scheduling the second cell to a BWP of the first cell incapable of scheduling the second cell.

In the foregoing possible implementations, optionally, the execution body may be a terminal. In other words, a network-side device may perform any one of the foregoing operations, but the terminal ignores such operation, that is, such operation does not take effect.

With the technical solutions provided in the embodiments of this disclosure, the scheduling configuration information is received, where the scheduling configuration information indicates that the second cell is scheduled by the first cell and that the second cell is capable of self-scheduling; the activity state of the first cell is determined; and the scheduling mode for the second cell is determined based on the scheduling configuration information and the activity state.

With the foregoing technical solutions provided in the embodiments of this disclosure, in a case that the second cell is scheduled by the first cell and that the second cell is capable of self-scheduling, the scheduling mode of the second cell is determined based on the activity state of the first cell and the scheduling configuration information. This provides a solution for determining the scheduling mode for the first cell to schedule the second cell, and addresses the issue of how a cell scheduling mode is determined for Scell to schedule Pcell.

It should be noted that the method for determining a cell scheduling mode in the embodiment of this disclosure may be performed by an apparatus for determining a cell scheduling mode, or a control module for performing the method for determining a cell scheduling mode in an apparatus for determining a cell scheduling mode. The embodiments of this disclosure describe the apparatus for determining a cell scheduling mode provided in an embodiment of this disclosure by using an example in which the apparatus for determining a cell scheduling mode performs the method for determining a cell scheduling mode.

Figure 3:
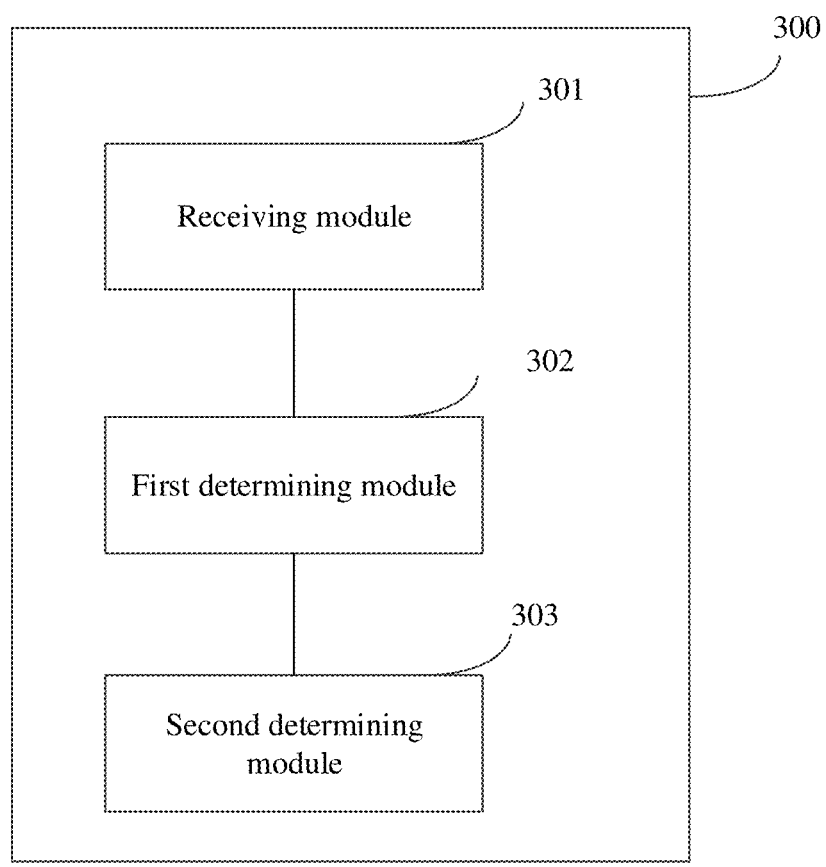
FIG. 3 is a schematic structural diagram of an apparatus for determining a cell scheduling mode according to an embodiment of this disclosure.

FIG. 3 is a schematic structural diagram of an apparatus for determining a cell scheduling mode according to an embodiment of this disclosure. As shown in FIG. 3, the apparatus 300 for determining a cell scheduling mode may include a receiving module 301, a first determining module 302, and a second determining module 303.

In this embodiment of this disclosure, the receiving module 301 is configured to receive scheduling configuration information, where the scheduling configuration information indicates that a second cell of a terminal is scheduled by a first cell of the terminal and that the second cell is capable of self-scheduling; the first determining module 302 is configured to determine an activity state of the first cell; and the second determining module 303 is configured to determine a scheduling mode for the second cell based on the scheduling configuration information and the activity state.

In a possible implementation, the scheduling configuration information further indicates at least one of the following:

a common search space CSS configured on the second cell;
a first UE-specific search space group configured on the second cell, where the first UE-specific search space group includes one or more complete UE-specific search spaces USS;
a second UE-specific search space group configured on the second cell, where the second UE-specific search space group includes one or more incomplete UE-specific search spaces, or the second UE-specific search space group includes one or more UE-specific search spaces that are capable of being mapped for cross-carrier scheduling; or
a search space configured on the first cell.

In a possible implementation, in a case that one complete UE-specific search space is a search space capable of being mapped for cross-carrier scheduling, the complete UE-specific search space belongs to both the first UE-specific search space group and the second UE-specific search space group.

In a possible implementation, the activity state of the first cell includes any one of the following:

the active state;
the inactive state;
transitioning from the active state to the inactive state;
transitioning from the inactive state to the active state;
the dormancy state;

the non-dormancy state;
transitioning from the dormancy state to the non-dormancy state;
transitioning from the non-dormancy state to the dormancy state;
having a search space capable of scheduling the second cell on an active BWP;
having no search space capable of scheduling the second cell on an active BWP;
switching from a first BWP to a second BWP, where the first BWP has a search space capable of scheduling the second cell, and the second BWP has no search space capable of scheduling the second cell; and
switching from the second BWP to the first BWP.

In a possible implementation, that the second determining module 303 determines a scheduling mode for the second cell based on the scheduling configuration information and the activity state includes:
in a case that the first cell is in a first target state, determining that the second cell is cross-carrier scheduled by the search space on the first cell, and that scheduling with scrambling by a specific RNTI is not performed in the CSS configured on the second cell and/or the first UE-specific search space group; or
determining that the second cell is cross-carrier scheduled by the search space on the first cell, that scheduling with scrambling by a specific RNTI is performed in the CSS configured on the second cell, and that scheduling with scrambling by a specific RNTI is not performed in the first UE-specific search space group; where
the first target state includes at least one of the following: active state; non-dormancy state; or having a search space capable of scheduling the second cell on the active BWP.

In a possible implementation, that the second determining module 303 determines a scheduling mode for the second cell based on the scheduling configuration information and the activity state includes:
in a case that the first cell is in a second target state, determining that the first cell is incapable of scheduling the second cell, and that scheduling with scrambling by a specific RNTI is performed in the CSS configured on the second cell and/or some or all USSs in the first UE-specific search space group; or
determining that the first cell is incapable of scheduling the second cell, that CSS self-scheduling with scrambling by a specific RNTI is performed on the second cell, and that scheduling with scrambling by a specific RNTI is performed in the CSS configured on the second cell and some or all USSs in the first UE-specific search space group; where
the second target state includes at least one of the following: the inactive state; the dormancy state; or having no search space capable of scheduling the second cell on the active BWP.

In a possible implementation, the some USSs are search spaces in the first UE-specific search space group, and the some USSs have a same identifier as a target search space, where the target search space is a search space in a currently active BWP of the first cell.

In a possible implementation, the determining a scheduling mode for the second cell based on the scheduling configuration information and the activity state includes:
in a case that the first cell is in a third target state, at a first target moment after first target information is received, enabling a function of performing scheduling with scrambling by a specific RNTI in the CSS configured on the second cell and/or the first UE-specific search space group; where
the third target state includes at least one of the following: transitioning from the active state to the inactive state; transitioning from the non-dormancy state to the dormancy state; or switching from the first BWP to the second BWP.

In a possible implementation, the first target information includes any one of the following: deactivation signaling for the first cell, control information indicating transitioning from non-dormancy state to dormancy state, and control information indicating switching from the first BWP to the second BWP.

In a possible implementation, the first target moment includes any one of the following:
an effective moment of an event indicated by the first target information;
when a predetermined time has elapsed since an effective moment of an event indicated by the first target information; and
a moment configured by RRC signaling.

In a possible implementation, that the second determining module 303 determines a scheduling mode for the second cell based on the scheduling configuration information and the activity state includes:
in a case that the first cell is in a third target state, at a second target moment after a target timer expires, enabling a function of performing scheduling with scrambling by a specific RNTI in the CSS configured on the second cell and/or the first UE-specific search space group; where
the third target state includes at least one of the following: transitioning from the active state to the inactive state; transitioning from the non-dormancy state to the dormancy state; or switching from the first BWP to the second BWP.

In a possible implementation, the target timer includes a cell deactivation timer or a BWP inactivity timer.

In a possible implementation, the second target moment includes any one of the following:
an effective moment of an event indicated by the expiration of the target timer;
when a predetermined time has elapsed since an effective moment of an event indicated by the expiration of the target timer; and
a moment configured by RRC signaling.

In a possible implementation, that the second determining module 303 determines a scheduling mode for the second cell based on the scheduling configuration information and the activity state includes:
in a case that the first cell is in a fourth target state, at a third target moment after second target information is received, disabling a function of performing scheduling with scrambling by a specific RNTI in the CSS configured on the second cell and/or the first UE-specific search space group; where
the fourth target state includes at least one of the following: transitioning from the inactive state to the active state; transitioning from the dormancy state to the non-dormancy state; or switching from the second BWP to the first BWP.

In a possible implementation, the third target moment includes any one of the following:
an effective moment of an event indicated by the second target information;

when a predetermined time has elapsed since an effective moment of an event indicated by the second target information; and a moment configured by RRC signaling.

In a possible implementation, the second target information includes any one of the following:

activation signaling for activating the first cell;

control information indicating that the first cell transitions from dormancy state to non-dormancy state; and control information indicating that the first cell switches from the second BWP to the first BWP.

In a possible implementation, the first determining module 302 is further configured to:

in a case that the scheduling configuration information indicates that the second cell is scheduled by the first cell, determine a behavior undesired by the terminal through pre-negotiation, where the behavior undesired by the terminal includes at least one of the following:

receiving control signaling for deactivating the first cell;

configuring a cell deactivation timer for the first cell;

configuring a BWP inactivity timer for a BWP of the first cell capable of scheduling the second cell; or switching from a BWP of the first cell capable of scheduling the second cell to a BWP of the first cell incapable of scheduling the second cell.

In a possible implementation, the first determining module 302 is further configured to:

in a case that the scheduling configuration information indicates that the second cell is scheduled by the first cell, ignore at least one of the following:

control signaling for deactivating the first cell;

configuring a cell deactivation timer for the first cell;

configuring a BWP inactivity timer for a BWP of the first cell capable of scheduling the second cell; or control information indicating switching from a BWP of the first cell capable of scheduling the second cell to a BWP of the first cell incapable of scheduling the second cell.

In a possible implementation, the first cell is a secondary cell, and the second cell is a primary cell.

The apparatus for determining a cell scheduling mode in this embodiment of this disclosure may be an apparatus, or may be a component, an integrated circuit, or a chip of a terminal. The apparatus may be a mobile terminal or a non-mobile terminal. For example, the mobile terminal may include but is not limited to types of the terminal 11 listed above, and the non-mobile terminal may be a server, a network attached storage (NAS), a personal computer (PC), a television (TV), a teller machine, a self-service machine, or the like. This is not specifically limited in the embodiments of this disclosure.

The apparatus for determining a cell scheduling mode in this embodiment of this disclosure may be an apparatus having an operating system. The operating system may be an Android operating system, may be an iOS operating system, or may be another possible operating system. This is not specifically limited in the embodiments of this disclosure.

The apparatus for determining a cell scheduling mode provided in this embodiment of this disclosure can implement the processes implemented in the method embodiment in FIG. 2, with the same technical effects achieved. To avoid repetition, details are not described herein again.

Figure 4:
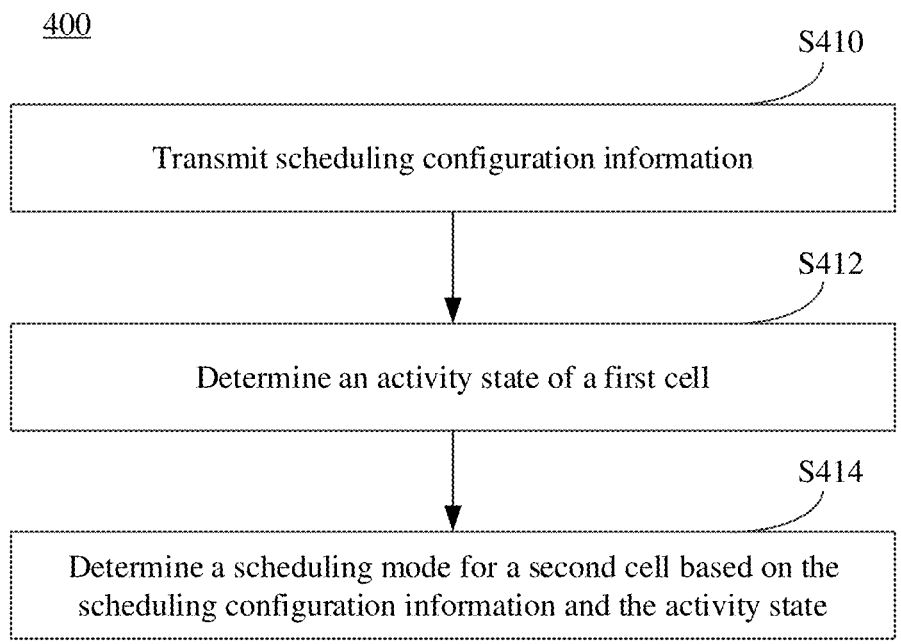
FIG. 4 is another schematic flowchart of a method for determining a cell scheduling mode according to an embodiment of this disclosure.

FIG. 4 is a schematic flowchart of a method for determining a cell scheduling mode according to an embodiment of this disclosure. The method 400 may be performed by a network-side device. In other words, the method may be performed by software or hardware installed on the network-side device. As shown in FIG. 4, the method may include the following steps.

S410. Transmit scheduling configuration information, where the scheduling configuration information indicates that a second cell of a terminal is scheduled by a first cell of the terminal and that the second cell is capable of self-scheduling.

S412. Determine an activity state of the first cell.

S414. Determine a scheduling mode for the second cell based on the scheduling configuration information and the activity state.

The method 400 is a method for a network-side device corresponding to the method 200, and has similar possible implementations to the method 200 except that the scheduling configuration information is transmitted by a network-side device in the method 400 and received by a terminal in the method 200. The following mainly describes some implementations of the method 400. For relevant details not described, reference may be made to the descriptions in the method 200. Details are not described herein again.

Optionally, the scheduling configuration information further indicates at least one of the following: a common search space configured on the second cell; a first UE-specific search space group configured on the second cell, where the first UE-specific search space group includes one or more complete UE-specific search spaces; a second UE-specific search space group configured on the second cell, where the second UE-specific search space group includes one or more incomplete UE-specific search spaces, or the second UE-specific search space group includes one or more UE-specific search spaces that are capable of being mapped for cross-carrier scheduling; and a search space configured on the first cell.

Optionally, in a case that one complete UE-specific search space is a search space capable of being mapped for cross-carrier scheduling, the complete UE-specific search space belongs to both the first UE-specific search space group and the second UE-specific search space group.

Optionally, the activity state of the first cell includes any one of the following: the active state; the inactive state;

transitioning from the active state to the inactive state; transitioning from the inactive state to the active state; the dormancy state; the non-dormancy state; transitioning from the dormancy state to the non-dormancy state; transitioning from the non-dormancy state to the dormancy state; having a search space capable of scheduling the second cell on an active BWP; having no search space capable of scheduling the second cell on an active BWP; switching from a first BWP to a second BWP, where the first BWP has a search space capable of scheduling the second cell, and the second BWP has no search space capable of scheduling the second cell; and switching from the second BWP to the first BWP.

Optionally, the determining a scheduling mode for the second cell based on the scheduling configuration information and the activity state includes: in a case that the first cell is in a first target state, determining that the second cell is cross-carrier scheduled by the search space on the first cell, and that scheduling with scrambling by a specific radio network temporary identifier RNTI is not performed in the CSS configured on the second cell and/or the first UE-specific search space group; or determining that the second cell is cross-carrier scheduled by the search space on the first cell, that scheduling with scrambling by a specific RNTI is performed in the CSS configured on the second cell, and that scheduling with scrambling by a specific RNTI is not performed in the first UE-specific search space group; where the first target state includes at least one of the following: active state; non-dormancy state; or having a search space capable of scheduling the second cell on the active BWP.

Optionally, the determining a scheduling mode for the second cell based on the scheduling configuration information and the activity state includes: in a case that the first cell is in a second target state, determining that the first cell is incapable of scheduling the second cell, and that scheduling with scrambling by a specific RNTI is performed in the CSS configured on the second cell and/or some or all USSs in the first UE-specific search space group; or determining that the first cell is incapable of scheduling the second cell, that CSS self-scheduling with scrambling by a specific RNTI is performed on the second cell, and that scheduling with scrambling by a specific RNTI is performed in the CSS configured on the second cell and some or all USSs in the first UE-specific search space group; where the second target state includes at least one of the following: the inactive state; the dormancy state; or having no search space capable of scheduling the second cell on the active BWP.

Optionally, the some USSs are search spaces in the first UE-specific search space group, and the some USSs have the same identifier as the target search space, where the target search space is a search space in a currently active BWP of the first cell.

Optionally, the determining a scheduling mode for the second cell based on the scheduling configuration information and the activity state includes: in a case that the first cell is in a third target state, at a first target moment after first target information is transmitted, enabling a function of performing scheduling with scrambling by a specific RNTI in the CSS configured on the second cell and/or the first UE-specific search space group; where the third target state includes at least one of the following: transitioning from the active state to the inactive state; transitioning from the non-dormancy state to the dormancy state; or switching from the first BWP to the second BWP.

Optionally, the first target information includes any one of the following: deactivation signaling for the first cell, control information indicating transitioning from non-dormancy state to dormancy state, and control information indicating switching from the first BWP to the second BWP.

Optionally, the first target moment includes any one of the following: an effective moment of an event indicated by the first target information; when a predetermined time has elapsed since an effective moment of an event indicated by the first target information; and a moment configured by radio resource control RRC signaling.

Optionally, the determining a scheduling mode for the second cell based on the scheduling configuration information and the activity state includes: in a case that the first cell is in a third target state, at a second target moment after a target timer expires, enabling a function of performing scheduling with scrambling by a specific RNTI in the CSS configured on the second cell and/or the first UE-specific search space group; where the third target state includes at least one of the following: transitioning from the active state to the inactive state; transitioning from the non-dormancy state to the dormancy state; or switching from the first BWP to the second BWP.

Optionally, the target timer includes a cell deactivation timer or a BWP inactivity timer.

Optionally, the second target moment includes: an effective moment of an event indicated by the expiration of the target timer; when a predetermined time has elapsed since an effective moment of an event indicated by the expiration of the target timer; or a moment configured by RRC signaling.

Optionally, the determining a scheduling mode for the second cell based on the scheduling configuration information and the activity state includes: in a case that the first cell is in a fourth target state, at a third target moment after second target information is transmitted, disabling a function of performing scheduling with scrambling by a specific RNTI in the CSS configured on the second cell and/or the first UE-specific search space group; where the fourth target state includes at least one of the following: transitioning from the inactive state to the active state; transitioning from the dormancy state to the non-dormancy state; or switching from the second BWP to the first BWP.

Optionally, the third target moment includes any one of the following: an effective moment of an event indicated by the second target information; when a predetermined time has elapsed since an effective moment of an event indicated by the second target information; and a moment configured by RRC signaling.

Optionally, the second target information includes any one of the following: activation signaling for activating the first cell; control information indicating that the first cell transitions from dormancy state to non-dormancy state; and control information indicating that the first cell switches from the second BWP to the first BWP.

Optionally, the method further includes: in a case that the scheduling configuration information indicates that the second cell is scheduled by the first cell, determining a behavior undesired by the terminal through pre-negotiation, where the behavior undesired by the terminal includes at least one of the following: transmitting control signaling for deactivating the first cell; configuring a cell deactivation timer for the first cell; or configuring a BWP inactivity timer for a BWP of the first cell capable of scheduling the second cell; and switching from a BWP of the first cell capable of scheduling the second cell to a BWP of the first cell incapable of scheduling the second cell.

Optionally, the method further includes: in a case that the scheduling configuration information indicates that the second cell is scheduled by the first cell, ignoring at least one of the following: control signaling for deactivating the first cell; configuring a cell deactivation timer for the first cell; configuring a BWP inactivity timer for a BWP of the first cell capable of scheduling the second cell; or control information indicating switching from a BWP of the first cell capable of scheduling the second cell to a BWP of the first cell incapable of scheduling the second cell.

Optionally, the first cell is a secondary cell, and the second cell is a primary cell.

Figure 5:
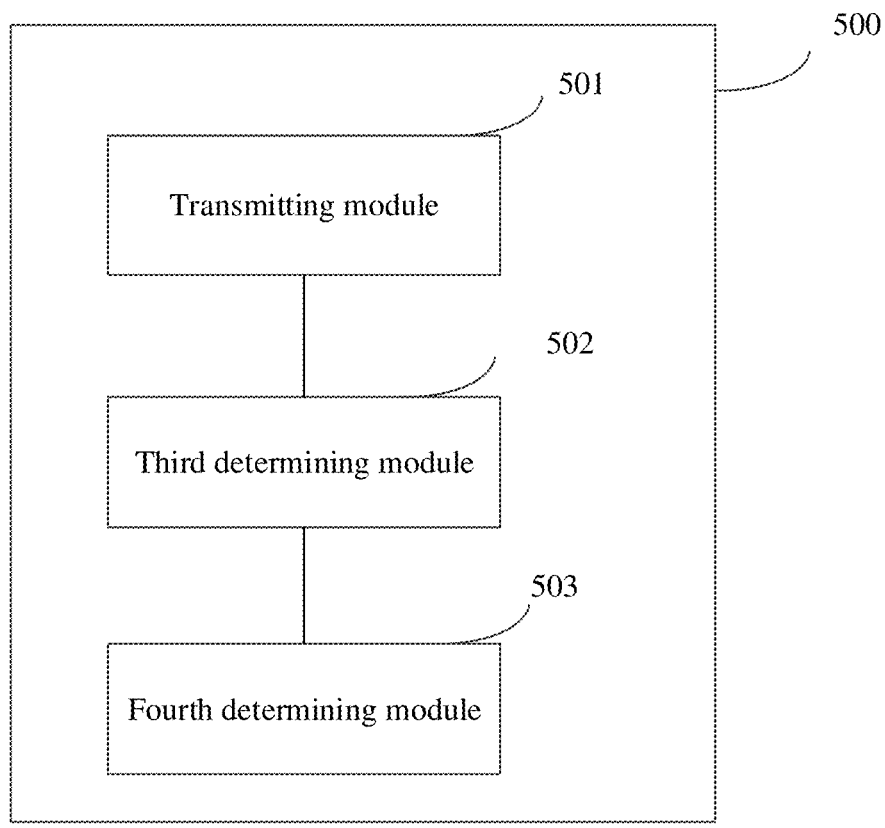
FIG. 5 is another schematic structural diagram of an apparatus for determining a cell scheduling mode according to an embodiment of this disclosure.

FIG. 5 is a schematic structural diagram of an apparatus for determining a cell scheduling mode according to an embodiment of this disclosure. As shown in FIG. 5, the apparatus 500 may include a transmitting module 501, configured to transmit scheduling configuration information, where the scheduling configuration information indicates that a second cell of a terminal is scheduled by a first cell of the terminal and that the second cell is capable of self-scheduling; a third determining module 502, configured to determine an activity state of the first cell; and a fourth determining module 503, configured to determine a scheduling mode for the second cell based on the scheduling configuration information and the activity state.

In a possible implementation, the scheduling configuration information further indicates at least one of the following:

a common search space CSS configured on the second cell;

a first UE-specific search space group configured on the second cell, where the first UE-specific search space group includes one or more complete UE-specific search spaces USS;

a second UE-specific search space group configured on the second cell, where the second UE-specific search space group includes one or more incomplete UE-specific search spaces, or the second UE-specific search space group includes one or more UE-specific search spaces that are capable of being mapped for cross-carrier scheduling; or a search space configured on the first cell.

In a possible implementation, in a case that one complete UE-specific search space is a search space capable of being mapped for cross-carrier scheduling, the complete UE-specific search space belongs to both the first UE-specific search space group and the second UE-specific search space group.

In a possible implementation, the activity state of the first cell includes any one of the following:

the active state;
the inactive state;
transitioning from the active state to the inactive state;
transitioning from the inactive state to the active state;
the dormancy state;
the non-dormancy state;
transitioning from the dormancy state to the non-dormancy state;
transitioning from the non-dormancy state to the dormancy state;
having a search space capable of scheduling the second cell on an active BWP;
having no search space capable of scheduling the second cell on an active BWP;
switching from a first BWP to a second BWP, where the first BWP has a search space capable of scheduling the second cell, and the second BWP has no search space capable of scheduling the second cell; and
switching from the second BWP to the first BWP.

In a possible implementation, that a fourth determining module 503 determines a scheduling mode for the second cell based on the scheduling configuration information and the activity state includes:

in a case that the first cell is in a first target state, determining that the second cell is cross-carrier scheduled by the search space on the first cell, and that scheduling with scrambling by a specific RNTI is not performed in the CSS configured on the second cell and/or the first UE-specific search space group; or determining that the second cell is cross-carrier scheduled by the search space on the first cell, that scheduling with scrambling by a specific RNTI is performed in the CSS configured on the second cell, and that scheduling with scrambling by a specific RNTI is not performed in the first UE-specific search space group; where the first target state includes at least one of the following: active state; non-dormancy state; or having a search space capable of scheduling the second cell on the active BWP.

In a possible implementation, that a fourth determining module 503 determines a scheduling mode for the second cell based on the scheduling configuration information and the activity state includes:

in a case that the first cell is in a second target state, determining that the first cell is incapable of scheduling the second cell, and that scheduling with scrambling by a specific RNTI is performed in the CSS configured on the second cell and/or some or all USSs in the first UE-specific search space group; or determining that the first cell is incapable of scheduling the second cell, that CSS self-scheduling with scrambling by a specific RNTI is performed on the second cell, and that scheduling with scrambling by a specific RNTI is performed in the CSS configured on the second cell and some or all USSs in the first UE-specific search space group; where the second target state includes at least one of the following: the inactive state; the dormancy state; or having no search space capable of scheduling the second cell on the active BWP.

In a possible implementation, the some USSs are search spaces in the first UE-specific search space group, and the some USSs have the same identifier as the target search space, where the target search space is a search space in a currently active BWP of the first cell.

In a possible implementation, the determining a scheduling mode for the second cell based on the scheduling configuration information and the activity state includes:

in a case that the first cell is in a third target state, at a first target moment after first target information is transmitted, enabling a function of performing scheduling with scrambling by a specific RNTI in the CSS configured on the second cell and/or the first UE-specific search space group; where the third target state includes at least one of the following: transitioning from the active state to the inactive state; transitioning from the non-dormancy state to the dormancy state; or switching from the first BWP to the second BWP.

In a possible implementation, the first target information includes any one of the following: deactivation signaling for the first cell, control information indicating transitioning from non-dormancy state to dormancy state, and control information indicating switching from the first BWP to the second BWP.

In a possible implementation, the first target moment includes any one of the following:

an effective moment of an event indicated by the first target information;
when a predetermined time has elapsed since an effective moment of an event indicated by the first target information; and
a moment configured by RRC signaling.

In a possible implementation, that a fourth determining module 503 determines a scheduling mode for the second cell based on the scheduling configuration information and the activity state includes:

in a case that the first cell is in a third target state, at a second target moment after a target timer expires, enabling a function of performing scheduling with scrambling by a specific RNTI in the CSS configured on the second cell and/or the first UE-specific search space group; where the third target state includes at least one of the following: transitioning from the active state to the inactive state; transitioning from the non-dormancy state to the dormancy state; or switching from the first BWP to the second BWP.

In a possible implementation, the target timer includes a cell deactivation timer or a BWP inactivity timer.

In a possible implementation, the second target moment includes any one of the following:

an effective moment of an event indicated by the expiration of the target timer;

when a predetermined time has elapsed since an effective moment of an event indicated by the expiration of the target timer; and a moment configured by RRC signaling.

In a possible implementation, that a fourth determining module 503 determines a scheduling mode for the second cell based on the scheduling configuration information and the activity state includes:

in a case that the first cell is in a fourth target state, at a third target moment after second target information is transmitted, disabling a function of performing scheduling with scrambling by a specific RNTI in the CSS configured on the second cell and/or the first UE-specific search space group; where the fourth target state includes at least one of the following: transitioning from the inactive state to the active state; transitioning from the dormancy state to the non-dormancy state; or switching from the second BWP to the first BWP.

In a possible implementation, the third target moment includes any one of the following:

an effective moment of an event indicated by the second target information;

when a predetermined time has elapsed since an effective moment of an event indicated by the second target information; and a moment configured by RRC signaling.

In a possible implementation, the second target information includes any one of the following:

activation signaling for activating the first cell;

control information indicating that the first cell transitions from dormancy state to non-dormancy state; and control information indicating that the first cell switches from the second BWP to the first BWP.

In a possible implementation, the third determining module 502 is further configured to:

in a case that the scheduling configuration information indicates that the second cell is scheduled by the first cell, determine a behavior undesired by the terminal through pre-negotiation, where the behavior undesired by the terminal includes at least one of the following:

transmitting control signaling for deactivating the first cell;

configuring a cell deactivation timer for the first cell;

configuring a BWP inactivity timer for a BWP of the first cell capable of scheduling the second cell; or switching from a BWP of the first cell capable of scheduling the second cell to a BWP of the first cell incapable of scheduling the second cell.

In a possible implementation, the third determining module 502 is further configured to:

in a case that the scheduling configuration information indicates that the second cell is scheduled by the first cell, ignore at least one of the following:

control signaling for deactivating the first cell;

configuring a cell deactivation timer for the first cell;

configuring a BWP inactivity timer for a BWP of the first cell capable of scheduling the second cell; or control information indicating switching from a BWP of the first cell capable of scheduling the second cell to a BWP of the first cell incapable of scheduling the second cell.

In a possible implementation, the first cell is a secondary cell, and the second cell is a primary cell.

Figure 6:
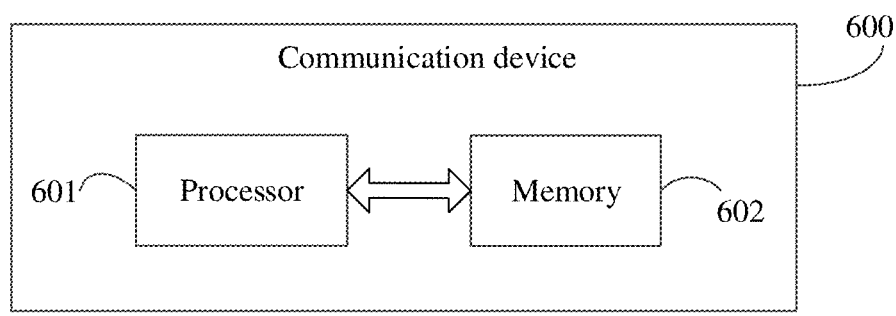
FIG. 6 is a schematic structural diagram of a communication device according to an embodiment of this disclosure.

Optionally, as shown in FIG. 6, an embodiment of this disclosure further provides a communication device 600, including a processor 601, a memory 602, and a program or instructions stored in the memory 602 and executable on the processor 601. For example, if the communication device 600 is a terminal, when the program or the instructions are executed by the processor 601, the processes of the foregoing embodiments of the method for determining a cell scheduling mode are implemented, with the same technical effects achieved. If the communication device 600 is a network-side device, when the program or the instructions are executed by the processor 601, the processes of the foregoing embodiments of the method for determining a cell scheduling mode are implemented, with the same technical effects achieved. To avoid repetition, details are not described herein again.

Figure 7:
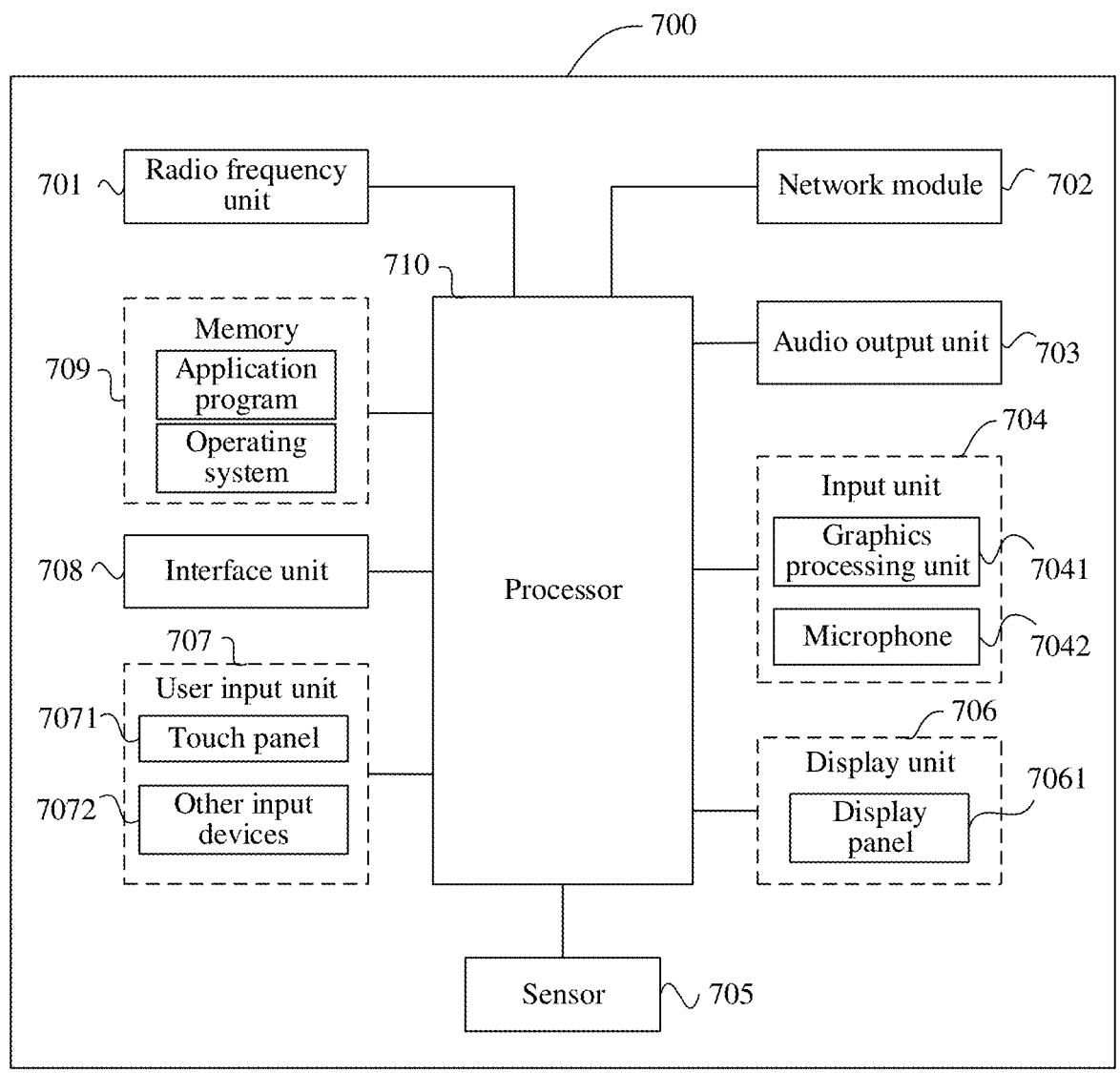
FIG. 7 is a schematic structural diagram of hardware of a terminal according to an embodiment of this disclosure.

FIG. 7 is a schematic diagram of a hardware structure of a terminal implementing an embodiment of this disclosure.

The terminal 700 includes but is not limited to components such as a radio frequency unit 701, a network module 702, an audio output unit 703, an input unit 704, a sensor 705, a display unit 706, a user input unit 707, an interface unit 708, a memory 709, and a processor 710.

A person skilled in the art can understand that the terminal 700 may further include a power supply (such as a battery) for supplying power to the components. The power supply may be logically connected to the processor 710 through a power management system. In this way, functions such as charge management, discharge management, and power consumption management are implemented by using the power management system. The terminal structure shown in FIG. 5 does not constitute a limitation to the terminal. The terminal may include more or fewer components than shown in the figure, or a combination of some components, or components disposed differently. Details are not described herein again.

It should be noted that in this embodiment of this disclosure, the input unit 704 may include a graphics processing unit (GPU) 7041 and a microphone 7042. The graphics processing unit 7041 processes image data of a static picture or a video that is obtained by an image capture apparatus (for example, a camera) in a video capture mode or an image capture mode. The display unit 706 may include a display panel 7061. The display panel 7061 may be configured in a form of a liquid crystal display, an organic light-emitting diode, or the like. The user input unit 707 includes a touch panel 7071 and other input devices 7072. The touch panel 7071 is also referred to as a touchscreen. The touch panel 7071 may include two parts: a touch detection apparatus and a touch controller. The other input devices 7072 may include but are not limited to a physical keyboard, a functional button (for example, a volume control key or a power on/off key), a trackball, a mouse, and a joystick. Details are not described herein.

In this embodiment of this disclosure, the radio frequency circuit 701 transmits downlink data received from a network-side device to the processor 710 for processing, and in addition, transmits uplink data to the network-side device. Generally, the radio frequency unit 701 includes but is not limited to an antenna, at least one amplifier, a transceiver, a coupler, a low noise amplifier, a duplexer, and the like.

The memory 709 may be configured to store software programs or instructions, and various data. The memory 709 may mainly include a program or instruction storage area and a data storage area. The program or instruction storage area may store an operating system, an disclosure program or instructions required by at least one function (for example, an audio play function and an image play function), and the like. In addition, the memory 709 may include a high-speed random access memory, and may further include a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory, for example, at least one magnetic disk storage device, a flash storage device, or another non-volatile solid-state storage device.

The processor 710 may include one or more processing units. Optionally, the processor 710 may integrate a disclosure processor and a modem processor. The disclosure processor mainly processes an operating system, a user interface, a disclosure program or instructions, and the like. The modem processor mainly processes wireless communication, for example, a baseband processor. It should be understood that alternatively, the modem processor may not be integrated into the processor 710.

The radio frequency unit 701 is configured to receive scheduling configuration information, where the scheduling configuration information indicates that a second cell of the terminal is scheduled by a first cell of the terminal and that the second cell is capable of self-scheduling;

The processor 710 determines an activity state of the first cell, and determines a scheduling mode for the second cell based on the scheduling configuration information and the activity state The terminal in this embodiment of the present disclosure further includes instructions or a program stored in the memory 709 and executable on the processor 710. The processor 710 invokes the instructions or program in the memory 709 to perform the method performed by the modules in FIG. 3, with the same technical effects achieved. To avoid repetition, details are not described herein again.

Figure 8:
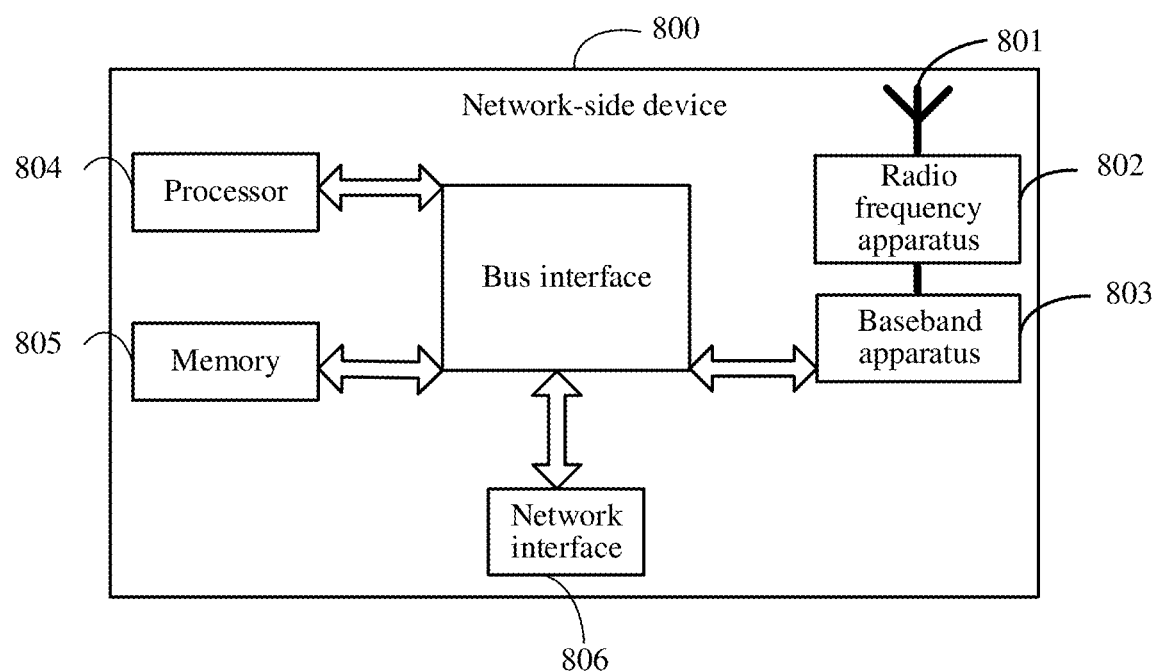
FIG. 8 is a schematic structural diagram of hardware of a network-side device according to an embodiment of this disclosure.

The embodiment of this disclosure further provides a network-side device. As shown in FIG. 8, the network-side device 800 includes an antenna 801, a radio frequency apparatus 802, and a baseband apparatus 803. The antenna 801 is connected to the radio frequency apparatus 802. In an uplink direction, the radio frequency apparatus 802 receives information by using the antenna 801, and transmits the received information to the baseband apparatus 803 for processing. In a downlink direction, the baseband apparatus 803 processes to-be-transmitted information, and transmits the information to the radio frequency apparatus 802; and the radio frequency apparatus 802 processes the received information and then transmits the information by using the antenna 801.

The radio frequency apparatus may be located in the baseband apparatus 803. The method performed by the network-side device in the foregoing embodiment may be implemented by the baseband apparatus 803, and the baseband apparatus 803 includes a processor 804 and a memory 805.

The baseband apparatus 803 may include, for example, at least one baseband processing unit, where a plurality of chips are disposed on the baseband processing unit. As shown in FIG. 8, one of the chips, for example, the processor 804, is connected to the memory 805, to invoke the program in the memory 805 to perform the operations of the network device shown in the foregoing method embodiment.

The baseband apparatus 803 may further include a network interface 806, configured to exchange information with the radio frequency apparatus 802, where the interface is, for example, a common public radio interface (CPRI).

The network-side device in this embodiment of the present disclosure further includes instructions or a program stored in the memory 805 and executable on the processor 804. The processor 804 invokes the instructions or program in the memory 805 to perform the method performed by the modules in FIG. 5, with the same technical effects achieved. To avoid repetition, details are not described herein again.

An embodiment of this disclosure further provides a non-transitory computer readable storage medium, where the non-transitory computer readable storage medium stores a program or instructions, and when the program or instructions are executed by a processor, the processes of the foregoing embodiments of the methods for determining a cell scheduling mode are implemented, with the same technical effects achieved. To avoid repetition, details are not described herein again.

The processor is the processor of the terminal or the network-side device in the foregoing embodiments. The non-transitory computer readable storage medium includes a non-transitory computer readable storage medium such as a computer read-only memory (ROM), a random access memory (RAM), a magnetic disk, or an optical disc.

An embodiment of this disclosure further provides a chip. The chip includes a processor and a communication interface. The communication interface is coupled to the processor. The processor is configured to run a program or instructions of a network-side device to implement the processes of the foregoing embodiments of the methods for determining a cell scheduling mode, with the same technical effects achieved. To avoid repetition, details are not described herein again.

It should be understood that the chip mentioned in this embodiment of this disclosure may also be referred to as a system-level chip, a system chip, a chip system, a system-on-chip, or the like.

It should be noted that, in this specification, the terms "include", "include", or any of their variants are intended to cover a non-exclusive inclusion, so that a process, a method, an article, or an apparatus that includes a series of elements not only includes those elements but also includes other elements that are not expressly listed, or further includes elements inherent to such a process, method, article, or apparatus. In the absence of more restrictions, an element defined by "including a . . . " does not exclude another same element in a process, method, article, or apparatus that includes the element. In addition, it should be noted that the scopes of the method and apparatus in the embodiments of this disclosure are not limited to performing functions in the sequence shown or discussed, and may further include performing functions at substantially the same time or in a reverse sequence according to the involved functions. For example, the described method may be performed in a sequence different from the described sequence, and steps may be added, omitted, or combined. In addition, features described with reference to some examples may be combined in other examples.

By means of the foregoing description of the embodiments, persons skilled in the art may clearly understand that the method in the foregoing embodiments may be implemented by software with a necessary general hardware platform. Certainly, the method in the foregoing embodiments may also be implemented by hardware. However, in many cases, the former is a preferred embodiment. Based on such an understanding, the technical solutions of this disclosure essentially, or the part contributing to the prior art may be implemented in a form of a software product. The software product is stored in a storage medium (for example, ROM/RAM, a magnetic disk, or an optical disc), and includes several instructions for instructing a terminal (which may be a mobile phone, a computer, a server, an air conditioner, a network device, or the like) to perform the method described in the embodiments of this disclosure.

The foregoing describes the embodiments of this disclosure with reference to the accompanying drawings. However, this disclosure is not limited to the foregoing specific embodiments. The foregoing specific embodiments are merely illustrative rather than restrictive. As instructed by this disclosure, a person of ordinary skill in the art may develop many other manners without departing from principles of this disclosure and the protection scope of the claims, and all such manners fall within the protection scope of this disclosure.

What is claimed is:

1. A method for determining a cell scheduling mode, performed by a terminal and comprising:
receiving scheduling configuration information, wherein the scheduling configuration information indicates that a second cell of the terminal is scheduled by a first cell of the terminal and that the second cell is capable of self-scheduling;
determining an activity state of the first cell; and
determining a scheduling mode for the second cell based on the scheduling configuration information and the activity state; wherein
the first cell is a secondary cell, and the second cell is a primary cell; and
the determining the scheduling mode for the second cell based on the scheduling configuration information and the activity state comprises: in a case that the first cell is in a second target state, determining that the first cell is incapable of scheduling the second cell, and that scheduling with scrambling by a specific radio network temporary identifier (RNTI) is performed in some or all UE-specific search spaces (USSs) in a first UE-specific search space group;
the second target state comprises at least one of following: an inactive state; a dormancy state; or having no search space capable of scheduling the second cell on an active bandwidth part (BWP).

2. The method according to claim 1, wherein the scheduling configuration information further indicates at least one of following:
a common search space (CSS) configured on the second cell;
the first UE-specific search space group configured on the second cell, wherein the first UE-specific search space group comprises one or more complete USSs;
a second UE-specific search space group configured on the second cell, wherein the second UE-specific search space group comprises one or more incomplete UE-specific search spaces, or the second UE-specific search space group comprises one or more UE-specific search spaces that are capable of being mapped for cross-carrier scheduling; or
a search space configured on the first cell.

3. The method according to claim 2, wherein in a case that one complete UE-specific search space is a search space capable of being mapped for cross-carrier scheduling, the complete UE-specific search space belongs to both the first UE-specific search space group and the second UE-specific search space group.

4. The method according to claim 1, wherein the some or all USSs are search spaces in the first UE-specific search space group, and the some USSs have a same identifier as a target search space, wherein the target search space is a search space in a currently active BWP of the first cell.

5. The method according to claim 1, wherein the method further comprises:
in a case that the scheduling configuration information indicates that the second cell is scheduled by the first cell, determining a behavior undesired by the terminal through pre-negotiation, wherein the behavior undesired by the terminal comprises at least one of following:
receiving control signaling for deactivating the first cell;
configuring a cell deactivation timer for the first cell;
configuring a BWP inactivity timer for a BWP of the first cell capable of scheduling the second cell; or
switching from a BWP of the first cell capable of scheduling the second cell to a BWP of the first cell incapable of scheduling the second cell.

6. The method according to claim 1, wherein the method further comprises:
in a case that the scheduling configuration information indicates that the second cell is scheduled by the first cell, ignore at least one of following:
control signaling for deactivating the first cell;
configuring a cell deactivation timer for the first cell;
configuring a BWP inactivity timer for a BWP of the first cell capable of scheduling the second cell; or
control information indicating switching from a BWP of the first cell capable of scheduling the second cell to a BWP of the first cell incapable of scheduling the second cell.

7. A non-transitory computer readable storage medium, wherein the readable storage medium stores a program or instructions, and when the program or the instructions are executed by a processor, steps of the method for determining a cell scheduling mode according to claim 1 are implemented.

8. A method for determining a cell scheduling mode, performed by a network-side device, wherein the method comprises:
transmitting scheduling configuration information, wherein the scheduling configuration information indicates that a second cell of a terminal is scheduled by a first cell of the terminal and that the second cell is capable of self-scheduling;
determining an activity state of the first cell; and
determining a scheduling mode for the second cell based on the scheduling configuration information and the activity state; wherein
the first cell is a secondary cell, and the second cell is a primary cell; and
the determining the scheduling mode for the second cell based on the scheduling configuration information and the activity state comprises: in a case that the first cell is in a second target state, determining that the first cell is incapable of scheduling the second cell, and that scheduling with scrambling by a specific radio network temporary identifier (RNTI) is performed in some or all UE-specific search spaces (USSs) in a first UE-specific search space group;
the second target state comprises at least one of following: an inactive state; a dormancy state; or having no search space capable of scheduling the second cell on an active bandwidth part (BWP).

9. A network-side device, comprising a processor, a memory, and a program or instructions stored in the memory and executable on the processor, wherein the program or the instructions, when executed by the processor, cause the network-side device to perform steps of the method for determining a cell scheduling mode according to claim 8.

10. A non-transitory computer readable storage medium, wherein the readable storage medium stores a program or instructions, and when the program or the instructions are executed by a processor, steps of the method for determining a cell scheduling mode according to claim 8 are implemented.

11. The method according to claim 8, wherein the scheduling configuration information further indicates at least one of following:
- a common search space (CSS) configured on the second cell;
- the first UE-specific search space group configured on the second cell, wherein the first UE-specific search space group comprises one or more complete USS;
- a second UE-specific search space group configured on the second cell, wherein the second UE-specific search space group comprises one or more incomplete UE-specific search spaces, or the second UE-specific search space group comprises one or more UE-specific search spaces that are capable of being mapped for cross-carrier scheduling; or
- a search space configured on the first cell.

12. The method according to claim 11, wherein in a case that one complete UE-specific search space is a search space capable of being mapped for cross-carrier scheduling, the complete UE-specific search space belongs to both the first UE-specific search space group and the second UE-specific search space group.

13. The method according to claim 8, wherein the some USSs are search spaces in the first UE-specific search space group, and the some USSs have a same identifier as a target search space, wherein the target search space is a search space in a currently active BWP of the first cell.

14. The method according to claim 8, wherein the method further comprises:
- in a case that the scheduling configuration information indicates that the second cell is scheduled by the first cell, determining a behavior undesired by the terminal through pre-negotiation, wherein the behavior undesired by the terminal comprises at least one of following:
- sending control signaling for deactivating the first cell;
- configuring a cell deactivation timer for the first cell;
- configuring a BWP inactivity timer for a BWP of the first cell capable of scheduling the second cell; or
- switching from a BWP of the first cell capable of scheduling the second cell to a BWP of the first cell incapable of scheduling the second cell.

15. The method according to claim 8, wherein the method further comprises:
- in a case that the scheduling configuration information indicates that the second cell is scheduled by the first cell, ignoring at least one of following:
- control signaling for deactivating the first cell;
- configuring a cell deactivation timer for the first cell;
- configuring a BWP inactivity timer for a BWP of the first cell capable of scheduling the second cell; or
- control information indicating switching from a BWP of the first cell capable of scheduling the second cell to a BWP of the first cell incapable of scheduling the second cell.

16. A terminal, comprising a processor, a memory, and a program or instructions stored in the memory and executable on the processor, wherein the program or the instructions, when executed by the processor, cause the terminal to perform:
- receiving scheduling configuration information, wherein the scheduling configuration information indicates that a second cell of the terminal is scheduled by a first cell of the terminal and that the second cell is capable of self-scheduling;
- determining an activity state of the first cell; and
- determining a scheduling mode for the second cell based on the scheduling configuration information and the activity state; wherein
- the first cell is a secondary cell, and the second cell is a primary cell; and
- the program or the instructions, when executed by the processor, cause the terminal to perform: in a case that the first cell is in a second target state, determining that the first cell is incapable of scheduling the second cell, and that scheduling with scrambling by a specific radio network temporary identifier (RNTI) is performed in some or all UE-specific search spaces (USSs) in a first UE-specific search space group;
- the second target state comprises at least one of following: an inactive state; a dormancy state; or having no search space capable of scheduling the second cell on an active bandwidth part (BWP).

17. The terminal according to claim 16, wherein the scheduling configuration information further indicates at least one of following:
- a common search space (CSS) configured on the second cell;
- the first UE-specific search space group configured on the second cell, wherein the first UE-specific search space group comprises one or more complete USS;
- a second UE-specific search space group configured on the second cell, wherein the second UE-specific search space group comprises one or more incomplete UE-specific search spaces, or the second UE-specific search space group comprises one or more UE-specific search spaces that are capable of being mapped for cross-carrier scheduling; or
- a search space configured on the first cell.

18. The terminal according to claim 17, wherein in a case that one complete UE-specific search space is a search space capable of being mapped for cross-carrier scheduling, the complete UE-specific search space belongs to both the first UE-specific search space group and the second UE-specific search space group.

19. The terminal according to claim 16, wherein the some USSs are search spaces in the first UE-specific search space group, and the some USSs have a same identifier as a target search space, wherein the target search space is a search space in a currently active BWP of the first cell.

20. The terminal according to claim 16, wherein the program or the instructions, when executed by the processor, cause the terminal to further perform:
- in a case that the scheduling configuration information indicates that the second cell is scheduled by the first cell, determining a behavior undesired by the terminal through pre-negotiation, wherein the behavior undesired by the terminal comprises at least one of following:
- receiving control signaling for deactivating the first cell;
- configuring a cell deactivation timer for the first cell;
- configuring a BWP inactivity timer for a BWP of the first cell capable of scheduling the second cell; or
- switching from a BWP of the first cell capable of scheduling the second cell to a BWP of the first cell incapable of scheduling the second cell.

* * * * *